(12) United States Patent
Watanabe

(10) Patent No.: US 7,057,762 B1
(45) Date of Patent: Jun. 6, 2006

(54) IMAGE PROCESSING METHOD, IMAGE PROCESSING APPARATUS AND IMAGE PROCESSING SYSTEM

(75) Inventor: Hideyuki Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 837 days.

(21) Appl. No.: 09/641,917

(22) Filed: Aug. 21, 2000

(30) Foreign Application Priority Data

Aug. 23, 1999 (JP) .................................. 11-234979
Aug. 14, 2000 (JP) ............................... 2000-245987

(51) Int. Cl.
G06F 15/00 (2006.01)
H04N 1/00 (2006.01)
H04N 1/32 (2006.01)

(52) U.S. Cl. ..................... 358/1.16; 358/1.13; 358/404; 358/468

(58) Field of Classification Search ............... 358/1.13, 358/1.15, 1.16, 404, 468
See application file for complete search history.

(56) References Cited

U.S. PATENT DOCUMENTS

| | | | | |
|---|---|---|---|---|
| 5,565,964 A | * | 10/1996 | Tashiro et al. | ................. 399/83 |
| 5,642,199 A | | 6/1997 | Ukai et al. | |
| 5,963,717 A | * | 10/1999 | Imamura | .................... 358/1.15 |
| 5,978,477 A | | 11/1999 | Hull et al. | |
| 6,084,685 A | * | 7/2000 | Mori | ........................ 385/1.14 |
| 6,252,681 B1 | * | 6/2001 | Gusmano et al. | ........... 358/468 |
| 6,678,065 B1 | * | 1/2004 | Hikawa | ...................... 358/1.13 |

FOREIGN PATENT DOCUMENTS

| | | |
|---|---|---|
| JP | 8-15299 | 2/1946 |
| JP | 61-57169 | 3/1986 |
| JP | 9-8989 | 1/1997 |
| JP | 10-173836 | 6/1998 |
| JP | 10-290315 | 10/1998 |
| JP | 10-336366 | 12/1998 |
| JP | 11-144033 | 5/1999 |
| JP | 11-196247 | 7/1999 |
| JP | 11-205497 | 7/1999 |

OTHER PUBLICATIONS

Alan Freeman, The computer desktop encyclopedia, 1999, 2nd Edition, pp. 255.*
Microsoft Computer Dictionary, 1999, 4th Edition, pp. 142.*
U.S. Appl. No. 09/641,917, filed Aug. 21, 2000, Watanabe.
U.S. Appl. No. 10/731,149, filed Dec. 10, 2003, Kanaya.
U.S. Appl. No. 10/885,624, filed Jul. 8, 2004, Watanabe.

* cited by examiner

Primary Examiner—Edward Coles
Assistant Examiner—Chan S. Park
(74) Attorney, Agent, or Firm—Oblon, Spivak, McClelland, Maier & Neustadt, P.C.

(57) ABSTRACT

An image processing method includes the steps of (a) carrying out, in parallel, processes of two or more functions of an image reading function, an image recording function, an image copying function and an image communicating function, and (b) automatically storing a file of the image data processed by the step (a) independently of the processes.

27 Claims, 10 Drawing Sheets

IMAGE PROCESSING METHOD, IMAGE PROCESSING APPARATUS AND IMAGE PROCESSING SYSTEM

BACKGROUND OF THE INVENTION

This application claims the benefit of Japanese Patent Applications No.11-234979 filed Aug. 23, 1999 and No.2000-245987 filed Aug. 14, 2000, in the Japanese Patent Office, the disclosures of which are hereby incorporated by reference.

1. Field of the Invention

The present invention generally relates to image processing methods, image processing apparatuses and image processing systems, and more particularly to an image processing method which automatically carries out an electronic filing when using an image reading function, an image recording function, an image copying function and an image communicating function, and an image processing apparatus and an image processing system which employ such an image processing method.

2. Description of the Related Art

Conventionally, image processing apparatuses which process image data which is obtained by electrically converting a document image, include a scanner for outputting the image data of the document image which is read, a facsimile machine for transmitting and receiving the image data, and a printer for plotting or printing the image data. Recently, a digital image processing apparatus has also be proposed, which includes a plurality of kinds of functions, including the functions of the scanner, the facsimile machine and the printer.

This type of multi-function image processing apparatus is proposed in a Japanese Published Patent Application No.8-15299, for example. This proposed multi-function image processing apparatus is capable of simultaneously carrying out a document copy operation and a facsimile communication operation, that is, parallel processes.

The documents which are processed in such image processing apparatuses, include important documents (including documents with images and characters) which need to be stored, and documents which have the possibility of being used in the future. However, a storage location is required to store such documents in the paper form, and it is difficult to search for a desired document from the documents stored in the paper form. On the other hand, the recent improvements in the processing speed and quality of data processing techniques as well as the realization of inexpensive storage units having large storage capacities, a so-called electronic filing apparatus has been proposed to electronically file the documents. The electronic filing apparatus reads the document by the scanner to obtain the image data, and the image data is stored in the storage unit having the large storage capacity.

In the conventional image processing apparatuses, however, the image data is obtained by electrically converting the document image, but the image data is lost after the processing of the image data is completed. For this reason, in order to store the image data in the electronic filing apparatus, it is necessary to read the document again by the scanner, thereby putting a load on the user in that the user must carry out this troublesome operation.

SUMMARY OF THE INVENTION

Accordingly, it is a general object of the present invention to provide a novel and useful image processing method, image processing apparatus and image processing system, in which the problems described above are eliminated.

Another and more specific object of the present invention is to provide an image processing method, an image processing apparatus and an image processing system, which can electronically file image data which are processed in an environment where a plurality of kinds of functions can be carried out in parallel, without requiring a user to be aware of such an electronic filing.

Still another object of the present invention is to provide an image processing method comprising the steps of: (a) carrying out, in parallel, processes of two or more functions of an image reading function, an image recording function, an image copying function and an image communicating function; and (b) automatically storing a file of the image data processed by the step (a) independently of the processes. According to the image processing method of the present invention, it is possible to electronically file image data which are processed in an environment where a plurality of kinds of functions can be carried out in parallel, without requiring a user to be aware of such an electronic filing.

A further object of the present invention is to provide an image processing apparatus comprising a scanner which reads a document and outputs image data; a facsimile communication unit which transmits and receives image data via a communication line; a plotter which records an image on a recording medium based on image data; and a control unit, responsive to a command, controlling two or more of the scanner, the facsimile communication unit and the plotter to carry out processes to process the image data in parallel, where the control unit automatically stores a file of the image data processed in parallel in a storage unit, independently of the processes. According to the image processing apparatus of the present invention, it is possible to electronically file image data which are processed in an environment where a plurality of kinds of functions can be carried out in parallel, without requiring a user to be aware of such an electronic filing.

Another object of the present invention is to provide an image processing apparatus comprising: image reading means for reading a document and outputs image data; image communicating means for communicating image data via a communication line; image recording means for recording an image on a recording medium based on image data; and control means, responsive to a command, controlling two or more of the image reading means, the image communicating means and the image recording means to carry out processes to process the image data in parallel, where the control means automatically stores a file of the image data processed in parallel in storing means, independently of the processes. According to the image processing apparatus of the present invention, it is possible to electronically file image data which are processed in an environment where a plurality of kinds of functions can be carried out in parallel, without requiring a user to be aware of such an electronic filing.

Another object of the present invention is to provide an image processing apparatus comprising: an image data bus line transferring image data in real-time; image reading means for reading a document image and outputting read image data to the image data bus line in real-time; image communicating means for receiving image data from a communication line to output received image data to the image data bus line, and for receiving transmitting image data from the image data bus line in real-time to transmit the transmitting image data to the communication line; image recording means for receiving recording image data from the image data bus line and recording an image on a recording medium based on the recording image data; control means for controlling one of the image reading means, the image communicating means and the image recording means which is unused for the processing of the image data to process the image data in parallel, in response to a command which is received during processing of the image data to carry out at least one of a reading operation by the image reading means, a recording operation by the image recording means, a transmitting operation by the image communicating means and a receiving operation by the image communication means; a buffer temporarily storing the read image data, the transmitting image data and the received image data on the image data bus line; a DMA transfer bus line which is used to transfer the image data within the buffer by a DMA transfer; image transfer means for transferring the image data within the buffer to the DMA transfer bus line based on a DMA transfer request which is received at a preset timing; and image storing means for storing the image data on the DMA transfer bus line. According to the image processing apparatus of the present invention, it is possible to electronically file image data which are processed in an environment where a plurality of kinds of functions can be carried out in parallel, without requiring a user to be aware of such an electronic filing.

Still another object of the present invention is to provide an image processing system comprising: an image processing apparatus including: image reading means for reading a document and outputs image data, image communicating means for communicating image data via a communication line, image recording means for recording an image on a recording medium based on image data, and control means, responsive to a command, controlling two or more of the image reading means, the image communicating means and the image recording means to carry out processes to process the image data in parallel; an electronic filing apparatus coupled to the image processing apparatus; and a storage unit coupled to the electronic filing apparatus, where the control means automatically stores a file of the image data processed in parallel in the storage unit, independently of the processes. According to the image processing system of the present invention, it is possible to electronically file image data which are processed in an environment where a plurality of kinds of functions can be carried out in parallel, without requiring a user to be aware of such an electronic filing.

A further object of the present invention is to provide an image processing system comprising: an image processing apparatus including: an image data bus line transferring image data in real-time, image reading means for reading a document image and outputting read image data to the image data bus line in real-time, image communicating means for receiving image data from a communication line to output received image data to the image data bus line, and for receiving transmitting image data from the image data bus line in real-time to transmit the transmitting image data to the communication line, image recording means for receiving recording image data from the image data bus line and recording an image on a recording medium based on the recording image data, control means for controlling one of the image reading means, the image communicating means and the image recording means which is unused for the processing of the image data to process the image data in parallel, in response to a command which is received during processing of the image data to carry out at least one of a reading operation by the image reading means, a recording operation by the image recording means, a transmitting operation by the image communicating means and a receiving operation by the image communication means, a buffer temporarily storing the read image data, the transmitting image data and the received image data on the image data bus line, a DMA transfer bus line which is used to transfer the image data within the buffer by a DMA transfer, image transfer means for transferring the image data within the buffer to the DMA transfer bus line based on a DMA transfer request which is received at a preset timing, and image storing means for storing the image data on the DMA transfer bus line; an electronic filing apparatus coupled to the image processing apparatus; and a storage unit coupled to the electronic filing apparatus, where the electronic filing apparatus automatically stores a file of the image data processed in parallel within the image processing apparatus into the storage unit, independently of the reading, recording, transmitting and receiving operations in the image processing apparatus. According to the image processing system of the present invention, it is possible to electronically file image data which are processed in an environment where a plurality of kinds of functions can be carried out in parallel, without requiring a user to be aware of such an electronic filing.

Other objects and further features of the present invention will be apparent from the following detailed description when read in conjunction with the accompanying drawings.

DESCRIPTION OF THE PREFERRED EMBODIMENTS

The present inventor studied various means of eliminating the problems of the prior art described above, and found that the usefulness and ease of operation of an image processing apparatus can be improved considerably, if it is possible to electronically file image data which are processed in an environment where a plurality of kinds of functions can be carried out in parallel, without requiring a user to be aware of such an electronic filing.

A description will be given of various embodiments of an image processing method according to the present invention, an image processing apparatus according to the present invention, and an image processing system according to the present invention, by referring to FIGS. 1 through 10.

Figure 1:
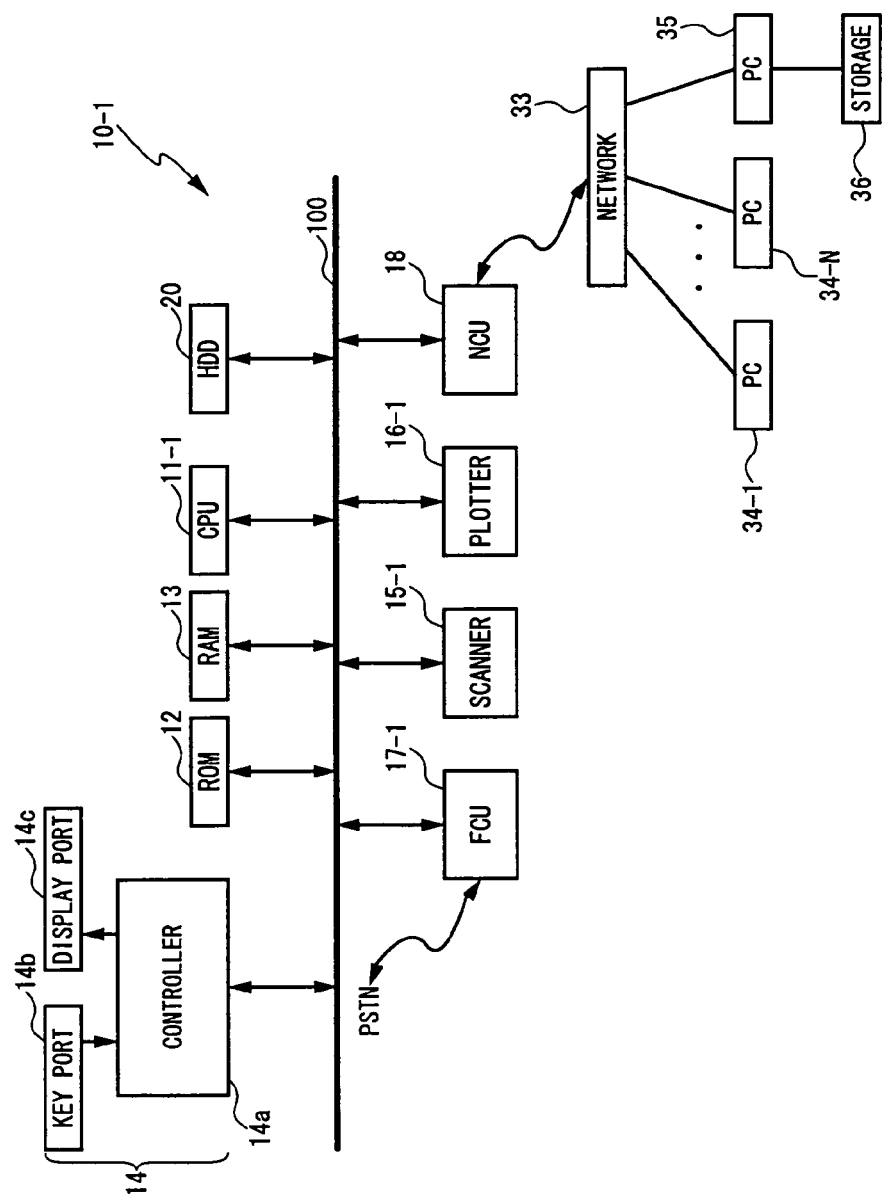
FIG. 1 is a system block diagram showing a first embodiment of an image processing system according to the present invention.

FIG. 1 is a system block diagram showing a first embodiment of an image processing system according to the present invention. This first embodiment of the image processing system employs a first embodiment of an image processing method according to the present invention and a first embodiment of an image processing apparatus according to the present invention. In this first embodiment, the present invention is applied to a digital copying machine having an image reading function, an image recording function, an image copying function and an image communicating function.

In FIG. 1, a multi-function peripheral (MFP) 10-1 forms a digital multi-function peripheral which is used as an image processing apparatus. A CPU 11-1 which functions as a control means, a ROM 12, a RAM 13, a display and operation section 14, a scanner 15-1 which functions as an image reading means, a plotter 16-1 which functions as an image recording means, a facsimile control unit (FCU) 17-1 which functions as an image communicating means, a network control unit (NCU) 18 which functions as a network connecting means, and a hard disk drive (HDD, or hard disk unit) 20 are connected to a system bus (or computer bus) 100 of the MFP 10-1. For example, a general purpose PCI may be used for the system bus 100. The CPU 11-1 reads control programs which are prestored in the ROM 12, and uses the RAM 13 as a work area for temporarily storing image data, sensor signals and the like, so as to centrally control various parts of the MFP 10-1. Under such a control of the CPU 11-1, the MFP 10-1 carries out various kinds of processes as the image processing apparatus, as well as the processes of the present invention.

The display and operation section 14 includes a controller 14a which is connected to the system bus 100, a key port 14b which is provided within an operation port located at a top front portion of a main body of the MFP 10-1, and a display port 14c. The key port 14b includes various operation keys including a ten-key and function keys, which are operated when a user inputs settings, commands and the like. The display port 14c has a liquid crystal display (LCD) for displaying various information including driving conditions, states of the MFP 10-1, and input conditions. This LCD is provided with a touch-panel (or touch-screen) which is operated when the user makes an input operation to select and input functions, input settings and the like. The controller 14a outputs input information received from the key port 14b to the CPU 11-1 via the system bus 100, and the display port 14c displays various information depending on instructions from the CPU 11-1 received via the system bus 100.

The scanner 15-1 is constructed to read image data by a known reading method. For example, an automatic document feeder (ADF, not shown) separates and feeds a document sheet one by one from a document table to a contact glass. The document sheet includes images, characters and the like, and is positioned at a reading position on the contact glass. Light from an exposure lamp irradiates the image surface of the document sheet, and reflected light from the document sheet is read by a CCD through photoelectric conversion, so as to obtain read image data. The read image data is transferred on the system bus 100 in real-time.

The plotter 16-1 is constructed to record the image data which is transferred on the system bus 100 in real-time, by a known electrophotography recording technique. For example, a photoconductor is rotated and charged, and an electrostatic latent image is optically written on this photoconductor. Toner is adhered on the electrostatic latent image to form a toner image, and the toner image is transferred onto and fixed on a recording medium such as paper which is fed from a paper feeding cassette. The recording medium recorded with the image is ejected outside the plotter 16-1. The image recording technique employed by the plotter 16-1 is not limited to the electrophotography recording technique, and it is of course possible to employ other image recording techniques such as ink jet recording techniques.

The FCU 17-1 modulates and demodulates image data and various procedure signals. In addition, the FCU 17-1 carries out a line control with respect to a public switched telephone network (PSTN, or public line) and connects or disconnects the line, so as to make a facsimile communication in which facsimile data are exchanged between the MFP 10-1 and a facsimile machine on the other end of the line. When making a facsimile transmission, the image data received from the scanner 15-1 via the system bus 100 is used as transmitting image data. On the other hand, when making a facsimile reception, received image data from the FCU 17-1 is transferred to the plotter 16-1 via the system bus 100 and recorded on the recording medium by the plotter 16-1.

Figure 2:
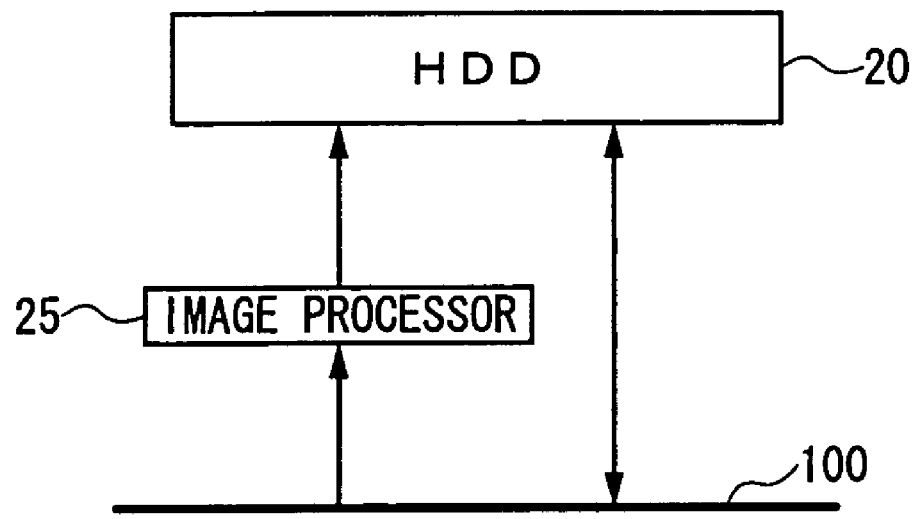
FIG. 2 is a system block diagram showing an important part of a modification of the first embodiment of the image processing system.

In this embodiment, the CPU 11-1 includes the functions of encoding and compressing the image data, and also decoding and expanding the encoded and compressed image data. However, as may be seen from FIG. 2, the MFP 10-1 may be provided with an image processor 25 which carries out the encoding and compressing of the image data and the decoding and expanding of the encoded and compressed image data, in place of the CPU 11-1. FIG. 2 is a system block diagram showing an important part of a modification of the first embodiment. In FIG. 2, those parts which are the same as those corresponding parts in FIG. 1 are designated by the same reference numerals, and a description thereof will be omitted.

When carrying out a copying function or the like, the CPU 11-1 may of course carry out an image processing with respect to the image data, so as to enlarge or reduce the image size depending on an instruction input by the user.

Therefore, the MFP 10-1 can be used as an image processing apparatus which includes an image reading function using the scanner 15-1, an image communicating function for receiving the image data of the facsimile communication using the FCU 17-1 or for transmitting the image data read by the image reading function, an image copying function for recording the image data read by the image reading function on the recording medium using the plotter 16-1, and an image recording function for recording the image data received by the image communicating function using the plotter 16-1.

The MFP 10-1 may be used in common by or, shared by, a plurality of terminals such as personal computers (PCs) 34-1 through 34-N which are connected to a network 33 which will be described later. In such a shared environment, the MFP 10-1 can send the image data read by the scanner 15-1 to the terminals via the network 33, and also receive the image data from the terminals via the network 33 so as to record the image data on the plotter 16-1.

The HDD 20 may be used to temporarily store the image data which is to be processed, when operating the reading function, the communicating function, the copying function and the recording function of the MFP 10-1. By temporarily storing the image data in the HDD 20, it is possible to avoid a plurality of these functions from becoming occupied since there is no need to wait for the processing to be completed with respect to the image data which is processed among these functions.

The NCU 18 is connected to the PCs 34-1 through 34-N and a PC 35 via the network 33. The NCU 18 forms a network interface (I/F) which enables data to be exchanged between the MFP 10-1 and the PCs 34-1 through 34-N and 35. The PC 35 forms an electronic filing apparatus which is capable of storing and managing files of data in a storage unit (image storing means) 36 having a large storage capacity, in a manner which enables the files to be retrieved and read from the storage unit 36. The MFP 10-1 transfers the image data which is processed by the user, as is, to the PC (hereinafter referred to as the electronic filing apparatus) 35, regardless of the issuance of a transfer instruction. As a result, a filing system (image processing system) which stores the files of the image data processed in the MFP 10-1 in a reusable manner, is formed by the MFP 10-1 and the electronic filing apparatus 35.

The electronic filing apparatus 35 is not limited to the structure shown in FIG. 1 in which the electronic filing apparatus 35 is connected to the MFP 10-1 via the network 33. In other words, the electronic filing apparatus 35 may be connected directly to the MFP 10-1. In addition, the storage unit 36 may be a part of the electronic filing apparatus 35 or, connected externally to the electronic filing apparatus 35. The storage unit 36 may be realized by any known storing means including HDD.

It is possible to connect the MFP 10-1 and the electronic filing apparatus 35 using an interface which is selected from a group of parallel interfaces including SCSI, serial interfaces including USB, and IEEE1394. However, in the following description, it is assumed for the sake of convenience that the MFP 10-1 and the electronic filing apparatus 35 are connected using the NCU 18.

Next, a description will be given of a network scanner function. In the case of the network scanner function, a read operation is carried out in which the image data read by the scanner 15-1 is output to the system bus 100. In addition, the read image data on the system bus 100 can be transferred via the NCU 18 to the PCs 34-1 through 34-N and 35 or the like which are connected to the network 33. The image data on the system bus 100 during this read operation can be stored in the HDD 20 which forms the image storing means.

Further, a description will be given of a network print function. In the case of the network print function, the recording image data which is transferred from the PCs 34-1 through 34-N and 35 or the like which are connected to the network to the MFP 10-1 via the NCU 18, is written in a print language such as PCL, PS, RPDL and IPDLC. The CPU 11-1 develops the recording image data which is transferred via the NCU 18 into image data which is recordable on the plotter 16-1. The developed image data is transferred to the plotter 16-1 via the system bus 100, and is recorded on the recording medium. The image data on the system bus 100 during this recording operation can be stored in the HDD 20 which forms the image storing means.

A description will now be given of (A) parallel processing of the copying function and the facsimile transmission function. First, a command specifying a plurality of copies to be made is input from the display and operation section 14 of the MFP 10-1. In this case, the scanner 15-1 scans only one page of the document. The image data read by the scanner 15-1 is stored in the HDD 20 via the system bus 100. A transfer T1 is carried out in which the read image data stored in the HDD 20 is again transferred on the system bus 100 and supplied to the plotter 16-1 which records the image of the read image data on the recording medium. Such an operation is repeated during the copying process to record the specified number of copies. On the other hand, during transfer of the read image data from the HDD 20 via the system bus 100, a transfer T2 is carried out in which the image data read by the scanner 15-1 is subjected to a facsimile transmission via the system bus 100 and the FCU 17-1 when a facsimile transmission command is input during this copying process. Because the system bus 100 is formed by PCI, the transfer T1 and the transfer T2 are alternately carried out time-divisionally. Of course, the time-divisionally transferred image data is stored in the HDD 20 which is used as the image storing means, and the electronic filing can be made to the electronic filing apparatus 35 while carrying out the parallel processing.

Other parallel processings include: (B) parallel processing of the network scanner function and the network print function, (C) parallel processing of the network scanner function and the facsimile reception function, (D) parallel processing of the facsimile transmission function and the network print function, (E) parallel processing of the network facsimile transmission function and the copying function, (F) parallel processing of the network facsimile transmission function and the network scanner function, (G) parallel processing of the network facsimile transmission function and the network print function, and (H) network facsimile transmission function, the network scanner function and the network print function.

The network facsimile transmission function makes a facsimile transmission via the NCU 18 and the network 33 to the PCs 34-1 through 34-N and 35 which are connected to the MFP 10-1 via the network 33.

Of the parallel processings (A) through (H) described above, in the parallel processings (B) through (E), the read image data output from the scanner 15-1 and the recording image data input to the plotter 16-1 are time-divisionally transferred on the system bus 100, and the electronic filing can be made while carrying out (A) the parallel processing of the copying function and the facsimile transmission function.

Similarly, in the parallel processings (E) through (H), the network facsimile transmission image data from the NCU 18, the read image data output from the scanner 15-1 and the recording image data input to the plotter 16-1 are time-divisionally transferred on the system bus 100. Hence, the electronic filing can be made similarly as described above during the parallel processings (E) through (H).

According to the parallel processings (A) through (G), two functions are carried out in parallel, but the number of functions which are carried out in parallel by the parallel processing is of course not limited to two. In other words, the number of functions which are carried out in parallel may be two or greater, and in the case of the parallel processing (H), three functions are carried out in parallel. In addition, the parallel processings are not limited to the parallel processings (A) through (H) described above, and various combinations of the functions are possible for the parallel processing.

For example, (I) parallel processing of the copying function and the facsimile reception function is also possible. In this case, when another process is carried out during the facsimile reception, the received image data is stored in the HDD 20 via the system bus 100 while carrying out the other process, that is, while carrying out the parallel processing. The received image data stored in the HDD 20 is read from the HDD 20 at a point in time when the parallel processing ends, and is transferred via the system bus 100 to the plotter 16-1 to be recorded on the recording medium.

The functions which may be combined with the facsimile reception function for the parallel processing include the network scanner function and the network print function. By combining such functions with the facsimile reception function, the parallel processing of three functions can be carried out.

If a transmission function and a reception function of the FCU 17-1 can be operated independently and the communication line has two lines by use of the ISDN line, for example, it is also possible to carry out the parallel processing of the facsimile transmission function and the facsimile reception function.

The CPU 11-1 of the MFP 10-1 also functions as a transfer means for carrying out a transfer process in parallel with the recording function which records the read image data from the scanner 15-1 on the recording medium by the plotter 16-1 or, the facsimile transmission function which transmits the read image data from the scanner 17-1 via the FCU 17-1. This transfer process adds to the read image data specific information which enables identification of the read image data, and after temporarily storing the same read image data in the HDD 20, transfers the read image data to the electronic filing apparatus 35 via the NCU 18. The specific information may be information related to the processing date and time, information related to the number of pages, information related to the destination telephone number or the like, so that the image data can be specified by the specific information.

In the electronic filing apparatus 35, an operation is carried out according to an application program which is read from an internal memory by operating a keyboard, a mouse or the like while monitoring a display. The image data transferred from the MFP 10-1 is stored and managed within the storage unit 36 in a reusable manner. Hence, similarly to the various kinds of processes including the creation of the document or image, the electronic filing apparatus 35 can carry out processes to retrieve and read the image data stored in the storage unit 36 to be displayed and/or recorded. The specific information may be added to the image data with respect to one document which is continuously processed before being stored in the storage unit 36. Thereafter, in response to a request from the user, it is possible to display a portion of the filed document, such as a thumbnail image of a top page, in a calendar display format, for example, so as to be selectable based on the specific information such as the processing data and time. Of the image data which is displayed, the image data selected by the user is read from the storage unit 36 in units of documents, and is transferred from the electronic filing apparatus 35 to the MFP 10-1, for example, so as to be recorded on the plotter 16-1 if necessary.

Therefore, the image data which is processed in the MFP 10-1 is automatically stored by the electronic filing apparatus 35, without the user being aware of this filing process. Hence, the image data which is processed in the MFP 10-1 can be reused to confirm the contents, for example, by retrieving the file of the image data from the electronic filing apparatus 35. It possible to successively display the image data in units of documents, so that the filed image data in the form of the electronic data can be reused or processed in any of the PCs 34-1 through 34-N and 35.

When automatically transferring the image data from the MFP 10-1 to the electronic filing apparatus 35 to be stored in the storage unit 36 without the user being aware of the filing process, it is possible to employ the techniques proposed in the U.S. Pat. No. 5,642,199 and No. 5,978,477, for example. Hence, a detailed description related to the transfer and storage of the image data with respect to the electronic filing apparatus 35 will be omitted in this specification.

Furthermore, when storing the image data in the HDD 20 within the MFP 10-1 and transferring the image data from the MFP 10-1 to the electronic filing apparatus 35, the specific information may be added to the image data and the specific information can be recognized using the techniques proposed in a U.S. patent application Ser. No. 09/407,768 filed Sep. 29, 1999, the disclosure of which is hereby incorporated by reference. Hence, a detailed description related to the methods of adding the specific information to the image data and recognizing the specific information will be omitted in this specification.

For example, when adding the specific information to the image data which is recorded on the plotter 16-1, the specific information may be input and set by a printer driver which is installed in the CPU 11-1, so that the image data is filed in a state where the specific information indicating the user individual or group is added to the image data. In addition, when the user (transmitting user) newly makes a facsimile transmission, an individual or group code of the destination may be input by operating the display and operation section 14 of the MFP 10-1 when transmitting the image data, so that the image data is filed in a state where the specific information is added.

Figure 3:
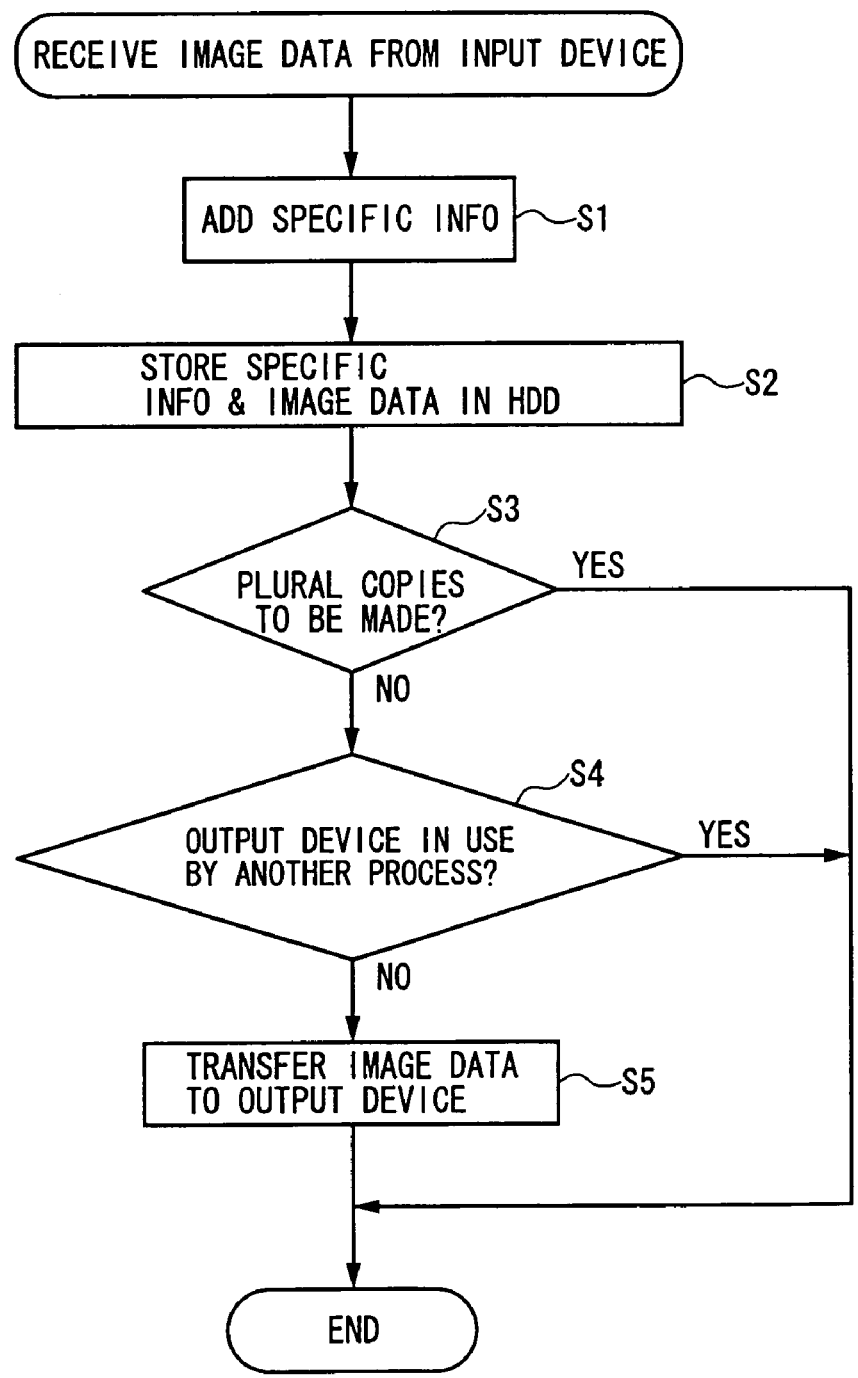
FIG. 3 is a flow chart for explaining the operation of the first embodiment of the image processing system.
Figure 4:
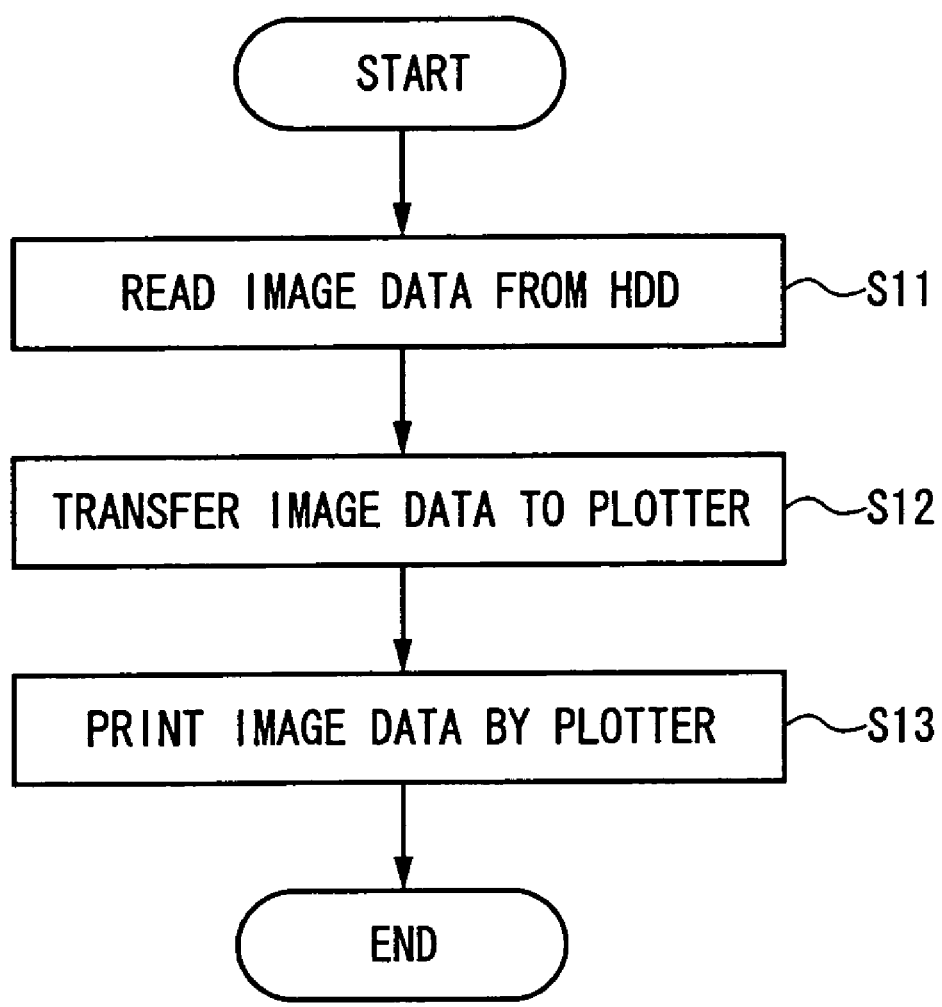
FIG. 4 is a flow chart for explaining the operation of the first embodiment of the image processing system.

Next, a description will be given of the operation of this embodiment, by referring to FIGS. 3 and 4. FIGS. 3 and 4 are flow charts for explaining the operation of this embodiment. The processes shown in FIGS. 3 and 4 correspond to the processes carried out by the CPU 11-1.

The process shown in FIG. 3 is started when the CPU 11-1 receives the image data from an input device. In FIG. 3, combinations of an "input device" and an "output device" differ depending on the functions, as shown below. In addition, "facsimile transmission" and "facsimile reception" are respectively denoted by "FAX transmission" and "FAX reception".

| Function | Input Device | Output Device |
| --- | --- | --- |
| Copy | Scanner 15-1 | Plotter 16-1 |
| FAX Transmission | Scanner 15-1 | FCU 17-1 |
| FAX Reception | FCU 17-1 | Plotter 16-1 |
| Network Scanner | Scanner 15-1 | NCU 18 |
| Network Print | NCU 18 | Plotter 16-1 |
| Network Fax Transmission | NCU 18 | FCU 17-1 |

In FIG. 3, a step S1 adds the specific information to the received image data. A step S2 stores the image data and the specific information in the HDD 20. A step S3 decides whether or not a plurality of copies are to be made, and the process ends if the decision result in the step S3 is YES. On the other hand, if the decision result in the step S3 is NO, a step S4 decides whether or not the output device is being used for another processing which is carried out in parallel. The process ends if the decision result in the step S4 is YES. If the decision result in the step S4 is NO, a step S5 transfers the image data to the output device, and the process ends.

FIG. 4 is a flow chart for explaining the operation when it become possible to use the output device. In FIG. 4, the plotter is described as an example of the output device, but the output device is of course not limited to the plotter, and a similar process is also carried out when the plotter is replaced by an output device which is other than the plotter and temporarily cannot be used because this output device is being used for another process which is carried out in parallel. As described above, when another process is carried out during the facsimile reception, the received image data is stored in the HDD 20 via the system bus 100 while carrying out the other process, that is, while carrying out the parallel processing. A step S11 reads the received image data which is stored in the HDD 20 from the HDD 20 at a point in time when the parallel processing ends. A step S12 transfers the read received image data to the plotter 16-1 via the system bus 100. A step S13 records the received image data on the recording medium by the plotter 16-1, and the process ends.

Figure 5:
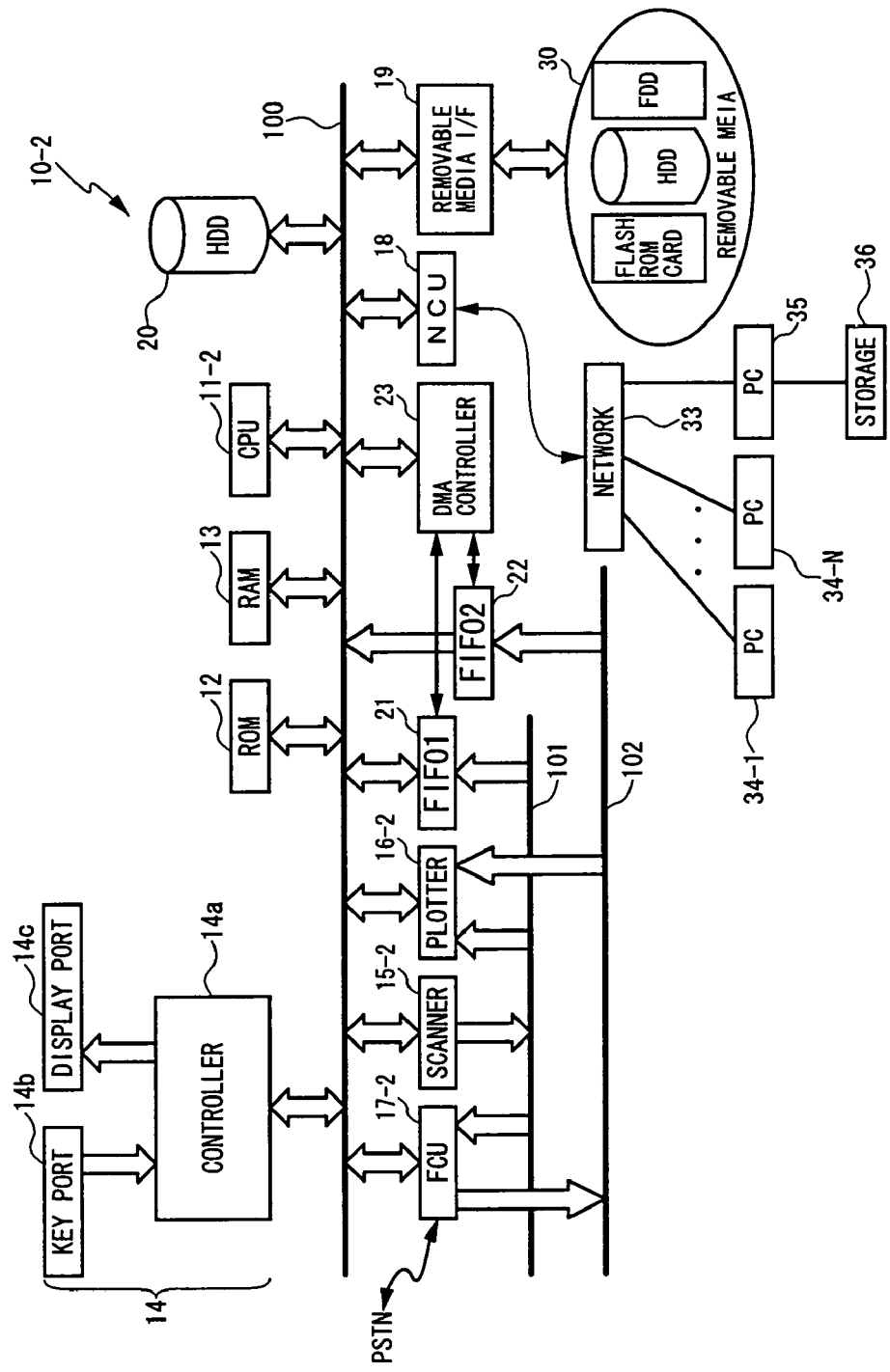
FIG. 5 is a system block diagram showing a second embodiment of the image processing system according to the present invention.

Next, a description will be given of a second embodiment of the image processing system according to the present invention. FIG. 5 is a system block diagram showing second embodiment of the image processing system according to the present invention. This second embodiment of the image processing system employs a second embodiment of the image processing method according to the present invention and a second embodiment of the image processing apparatus according to the present invention. In this second embodiment, the present invention is applied to a digital copying machine having an image reading function, an image recording function, an image copying function and an image communicating function. In FIG. 5, those parts which are the same as those corresponding parts in FIG. 1 are designated by the same reference numerals, and a description thereof will be omitted.

In FIG. 5, a multi-function peripheral (MFP) 10-2 forms a digital multi-function peripheral which is used as an image processing apparatus. A CPU 11-2 which functions as a control means, the ROM 12, the RAM 13, the display and operation section 14, a scanner 15-2 which functions as an image reading means, a plotter 16-2 which functions as an image recording means, a facsimile control unit (FCU) 17-2 which functions as an image communicating means, the NCU 18 which functions as a network connecting means, a removable media interface (I/F) 19, the HDD 20, a First-in-first-out (FIFO) buffer (FIFO1) 21, a FIFO buffer (FIFO2) 22 and a direct memory access (DMA) controller 23 are connected to the system bus (or computer bus) 100 of the MFP 10-2. The CPU 11-2 reads control programs which are prestored in the ROM 12, and uses the RAM 13 as a work area for temporarily storing image data, sensor signals and the like, so as to centrally control various parts of the MFP 10-2. Under such a control of the CPU 11-2, the MFP 10-2 carries out various kinds of processes as the image processing apparatus, as well as the processes of the present invention.

The MFP 10-2 is also connected to image data buses (lines) 101 and 102 which transfer image data which is input or output with respect to the scanner 15-2, the plotter 16-2 and the FCU 17-2 in real-time. The image data to be processed can be input and output on the image data buses 101 and 102, so as to enable exchange of the image data between two devices via the image data buses 101 and 102 by a simple control operation.

The scanner 15-2 is constructed to read image data by a known reading method. For example, an automatic document feeder (ADF, not shown) separates and feeds a document sheet one by one from a document table to a contact glass. The document sheet includes images, characters and the like, and is positioned at a reading position on the contact glass. Light from an exposure lamp irradiates the image surface of the document sheet, and reflected light from the document sheet is read by a CCD through photoelectric conversion, so as to obtain read image data. The read image data is transferred on the system bus 100 in real-time.

The plotter 16-2 is constructed to record the image data which is transferred on the system bus 100 in real-time, by a known electrophotography recording technique. For example, a photoconductor is rotated and charged, and an electrostatic latent image is optically written on this photoconductor. Toner is adhered on the electrostatic latent image to form a toner image, and the toner image is transferred onto and fixed on a recording medium such as paper which is fed from a paper feeding cassette. The recording medium recorded with the image is ejected outside the plotter 16-2. The image recording technique employed by the plotter 16-2 is not limited to the electrophotography recording technique, and it is of course possible to employ other image recording techniques such as ink jet recording techniques.

The FCU 17-2 modulates and demodulates image data and various procedure signals. In addition, the FCU 17-2 carries out a line control with respect to a public switched telephone network (PSTN, or public line) and connects or disconnects the line, so as to make a facsimile communication in which facsimile data are exchanged between the MFP 10-2 and a facsimile machine on the other end of the line. When making a facsimile transmission, the image data received from the scanner 15-2 via the image data bus 101 is used as transmitting image data. On the other hand, when making a facsimile reception, received image data from the FCU 17-2 is transferred to the plotter 16-2 via the image data bus 102 and recorded on the recording medium by the plotter 16-2.

The CPU 11-2 may include the functions of encoding and compressing the image data, and also decoding and expanding the encoded and compressed image data, similarly to the CPU 11-1 of the first embodiment described above. Furthermore, the MFP 10-2 may be provided with an image processor which carries out the encoding and compressing of the image data and the decoding and expanding of the encoded and compressed image data, in place of the CPU 11-2, similarly as in the case of the modification shown in FIG. 2. Moreover, when carrying out a copying function or the like, the CPU 11-2 may of course carry out an image processing with respect to the image data, so as to enlarge or reduce the image size depending on an instruction input by the user.

Therefore, the MFP 10-2 can be used as an image processing apparatus which includes an image reading function using the scanner 15-2, an image communicating function for receiving the image data of the facsimile communication using the FCU 17-2 or for transmitting the image data read by the image reading function, an image copying function for recording the image data read by the image reading function on the recording medium using the plotter 16-2, and an image recording function for recording the image data received by the image communicating function using the plotter 16-2.

The MFP 10-2 may be used in common by or, shared by, a plurality of terminals such as the PCs 34-1 through 34-N which are connected to the network 33 which will be described later. In such a shared environment, the MFP 10-2 can send the image data read by the scanner 15-2 to the terminals via the network 33, and also receive the image data from the terminals via the network 33 so as to record the image data on the plotter 16-2.

The HDD 20 may be used to temporarily store the image data which is to be processed, when operating the reading function, the communicating function, the copying function and the recording function of the MFP 10-2. By temporarily storing the image data in the HDD 20, it is possible to avoid a plurality of these functions from becoming occupied since there is no need to wait for the processing to be completed with respect to the image data which is processed among these functions.

The NCU 18 is connected to the PCs 34-1 through 34-N and the PC 35 via the network 33. The NCU 18 forms a network interface (I/F) which enables data to be exchanged between the MFP 10-2 and the PCs 34-1 through 34-N and 35. The PC 35 forms the electronic filing apparatus which is capable of storing and managing files of data in the storage unit (image storing means) 36 having a large storage capacity, in a manner which enables the files to be retrieved and read from the storage unit 36. The MFP 10-2 transfers the image data which is processed by the user, as is, to the PC (hereinafter referred to as the electronic filing apparatus) 35, regardless of the issuance of a transfer instruction. As a result, a filing system (image processing system) which stores the files of the image data processed in the MFP 10-2 in a reusable manner, is formed by the MFP 10-2 and the electronic filing apparatus 35.

The removable media interface 19 can transfer and write the image data in files by setting a data exchangeable removable media 30 such as a HDD, a floppy disk drive (FDD), and a flash ROM card. For this reason, it is possible to read an image data file from the removable media 30 and transfer the image data file to the electronic filing apparatus 35 to be stored and managed in the storage unit 36, via the NCU 18 and the network 33.

The electronic filing apparatus 35 does not need to be connected to the MFP 10-2 via the network 33, and the electronic filing apparatus 35 may be connected directly to the MFP 10-2.

In the MFP 10-2, the FIFO buffers 21 and 22 and the DMA controller 23 which forms an image transfer means are connected to the system bus 100. The FIFO buffer 21 which is also connected to the image data bus 101 temporarily stores the image data which is input and output on the image data bus 101. The FIFO buffer 22 which is also connected to the image data bus 102 temporarily stores the image data which is input and output on the image data bus 102. Based on a DMA transfer request which is received when the storage capacities occupied by the image data temporarily stored in the FIFO buffers 21 and 22 reach a predetermined preset value, the DMA controller 23 carries out a control to transfer the image data stored in the FIFO buffers 21 and 22 to the RAM (image storing means) 13 via the system bus (DMA transfer bus) 100 by a DMA transfer.

Figure 6:
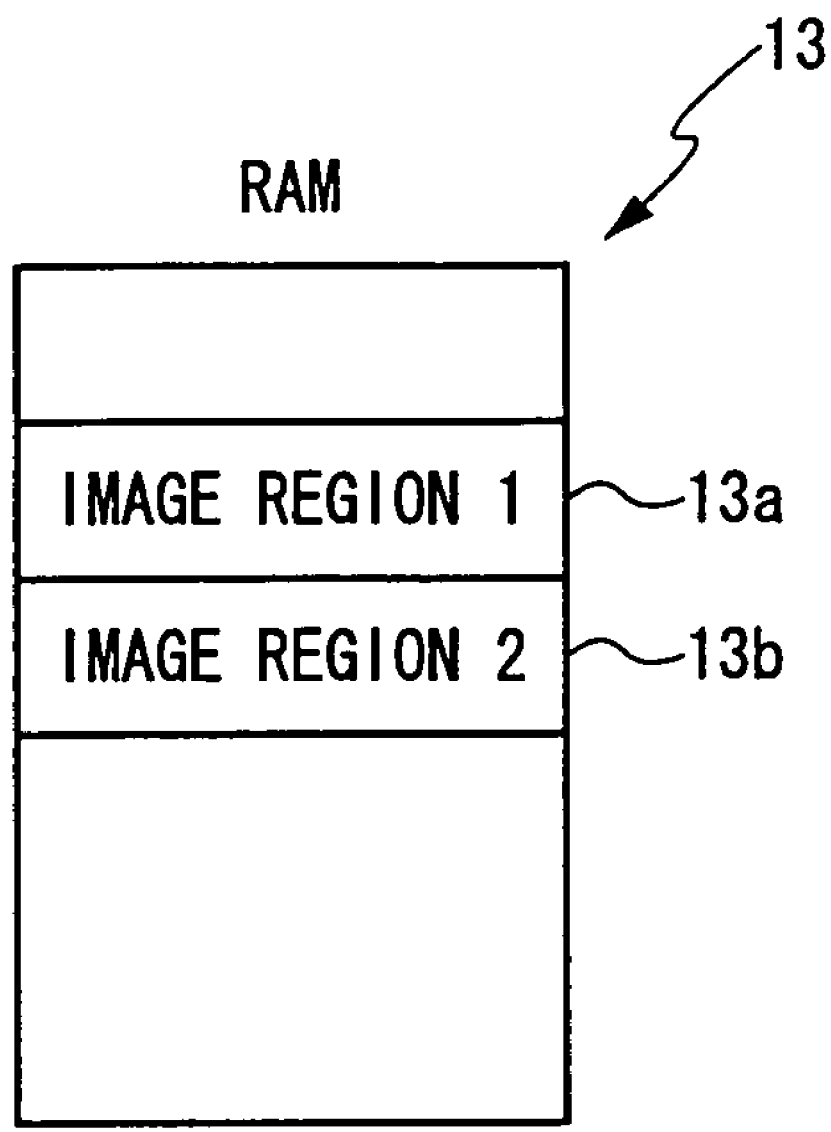
FIG. 6 is a diagram for explaining image regions within a RAM.

As shown in FIG. 6, the image data which are transferred from the FIFO buffers 21 and 22 by the DMA transfer are respectively stored in storage regions 13a and 13b which are preset within the RAM 13. Then, the image data stored in the storage regions 13a and 13b of the RAM 13 are transferred to and stored in the HDD (image storing means) 20 in response to a transfer command from the CPU 11-2. The image data stored in the HDD 20 are transferred at a predetermined timing to the electronic filing apparatus 35 via the NCU 18 and the network 33, to be stored in the storage unit 36 under the management of the electronic filing apparatus 35. For example, the predetermined timing may be a time band, such as night, when the communication load or traffic is small.

More particularly, when the parallel processing of the copying function and the facsimile transmission function is carried out, for example, a command specifying a plurality of copies to be made is first input from the display and operation section 14 of the MFP 10-2. In this case, the scanner 15-2 scans only one page of the document. The image data read by the scanner 15-2 is stored in the HDD 20 via the image data bus 101, the FCU 17-2 and the system bus 100. The read image data stored in the HDD 20 is again transferred on the system bus 100 and supplied via the FCU 17-2 and the image data bus 102 to the plotter 16-2 which records the image of the read image data on the recording medium. Such an operation is repeated during the copying process to record the specified number of copies. On the other hand, when a facsimile transmission command is input during this copying process, the image data read by the scanner 15-2 is subjected to a facsimile transmission via the image data bus 101 and the FCU 17-2, in parallel with the transfer of the read image data from the HDD 20 to the plotter 16-2 via the system bus 100, the FCU 17-2 and the image data bus 102.

During this parallel processing, the image data on the image data buses 101 and 102 are temporarily stored in the respective FIFO buffers 21 and 22, normally, even if no specific command is received from the CPU 11-2. When the occupied storage capacity of at least one of the FIFO buffers 21 and 22 monitored by the DMA controller 23 reaches a predetermined preset value, the DMA controller 23 specifies at least one of the FIFO buffers 21 and 22, and the image data within the specified FIFO buffer 21 and/or FIFO buffer 22 is transferred to and stored in the preset storage region 13a and/or storage region 13b within the RAM 13 via the system bus (DMA transfer bus) 100. In the case of the parallel processing of the copying function and the facsimile transmission function, the image data which is transferred on the image data bus 102 is also transferred on the image data bus 101, and the same image data is transferred repeatedly for the number of copies made. Hence, in this particular case, the image data which is transferred on the image data bus 102 is not transferred to the FIFO buffer 22.

The DMA controller 23 is set to alternately switch an order of priority with respect to the DMA transfer requests for the FIFO buffers 21 and 22 which are simultaneously generated. In other words, when the occupied storage capacities of both the FIFO buffers 21 and 22 reach the predetermined preset value and the DMA transfer requests for both the FIFO buffers 21 and 22 are generated, the DMA controller 23 alternately switches the request accepting priorities, by accepting the DMA transfer request with respect to the image data within the FIFO buffer 21 the first time the DMA transfer requests are simultaneously generated, and accepting the DMA transfer request with respect to the image data within the FIFO buffer 22 the second time the DMA transfer requests are simultaneously generated. Of course, the request accepting priority set in the DMA controller 23 may be reversed from the above.

Accordingly, the first time the DMA transfer requests are simultaneously generated, the DMA controller 23 accepts the DMA transfer request to transfer the image data within one of the FIFO buffers 21 and 22 to the RAM 13, and the second time the DMA transfer requests are simultaneously generated, the DMA controller 23 accepts the other DMA transfer request to transfer the image data within the other of the FIFO buffers 21 and 22 to the RAM 13. In addition, the CPU 11-2 transfers the image data within the RAM 13 to the HDD 20 via the system bus 100 to be stored in the HDD 20, at a timing when the occupied storage capacities of the FIFO buffers 21 and 22 reach the predetermined preset value. As a result, the image data which are temporarily stored in the FIFO buffers 21 and 22 can be transferred to the RAM 13 at a high speed without any dropout of data. Thereafter, the image data within the RAM 13 can be transferred to and stored in the HDD 20 which has a large storage capacity. The predetermined preset value for triggering the DMA transfer requests for the image data within the FIFO buffers 21 and 22 may be set so that, even if the image data within one of the FIFO buffers 21 and 22 is transferred by the DMA transfer in response to the simultaneous DMA transfer requests, the other of the FIFO buffers 21 and 22 will not overflow by the next monitoring timing. Hence, it is of course possible to set the predetermined preset value so that the DMA transfer is made every time the processing of the image data ends.

When recording the image data read by the scanner 15-2 on the recording medium by the plotter 16-2 or making the facsimile transmission of the image data read by the scanner 15-2 by the FCU 17-2, the CPU 11-2 simultaneously carries out a process of adding the specific information to the image data when temporarily storing the image data in the RAM 13 and the HDD 20. For example, the specific information includes information for specifying the image data for each process, such as the information related to the processing date and time, information related to the number of pages, information related to the destination telephone number and the like. The specific information is also added to the image data when a transfer process is carried out to transfer the image data within the HDD 20 to the electronic filing apparatus 35 via the NCU 18 and the network 33 at the predetermined preset timing. Hence, the image data within the HDD 20 is added with the specific information and transferred to the electronic filing apparatus 35, so that the image data can be stored in the storage unit 36 and managed by the electronic filing apparatus 35, so as to permit storage and management independently of the MFP 10-2. When providing the electronic filing apparatus 35 externally to the MFP 10-2, it is unnecessary to provide an extremely large storage capacity in the HDD 20.

Therefore, according to this embodiment, the image data which are input to the image data buses 101 and 102 and processed in parallel, are obtained from each of the image data buses 101 and 102 and temporarily stored in the respective FIFO buffers 21 and 22. In addition, when the occupied storage capacities of the FIFO buffers 21 and 22 reach the predetermined preset value, the image data within the FIFO buffers 21 and 22 are quickly transferred to the RAM 13 via the system bus 100 by the DMA transfer, and stored in the RAM 13. The image data stored in the RAM 13 can thereafter be stored in the HDD 20 having the large storage capacity. Accordingly, by the simple control which is carried out for each of the image data buses 101 and 102, it is possible to transfer the image data which is subjected to the parallel processing in the MFP 10-2 to the electronic filing apparatus 35 via the network 33, so as to file the image data in a reusable manner in the storage unit 36. If the occupied storage capacities of the FIFO buffers 21 and 22 simultaneously reach the predetermined preset value, the DMA transfer can be made by alternately switching the order of priority of the DMA transfer with respect to the FIFO buffers 21 and 22, so that the image data which is subjected to the parallel processing in the MFP 10-2 can be transferred to and stored in the electronic filing apparatus 35 without any data dropout. Hence, the image data which is subjected to the parallel processing in the MFP 10-2 can be automatically transferred to and managed by the electronic filing apparatus 35 in a simply reusable manner, without requiring the user to carry out a specific operation.

In this embodiment, the image data to be processed in the MFP 10-2 are input and output on the image data buses 101 and 102. However, it is of course possible to obtain effects similar to those obtainable by this embodiment when the present invention is applied to an image processing apparatus which carries out the parallel processing by inputting and outputting the image data to be processed on a single image data bus (line).

Next, a description will be given of the operation of this embodiment, by referring to FIGS. 7 through 10. FIGS. 7 through 10 are flow charts for explaining the operation of this embodiment. The processes shown in FIGS. 7 through 10 correspond to the processes carried out by the CPU 11-2. The general process carried out by the CPU 11-2 is basically the same as that carried out by the CPU 11-1 of the first embodiment described above and shown in FIGS. 3 and 4. Accordingly, in FIGS. 7 through 10, a description will be given of the processes particularly related to the DMA transfer. FIGS. 7 through 10 show processes which are carried out up to the transfer of the image data to the RAM 13.

Figure 7:
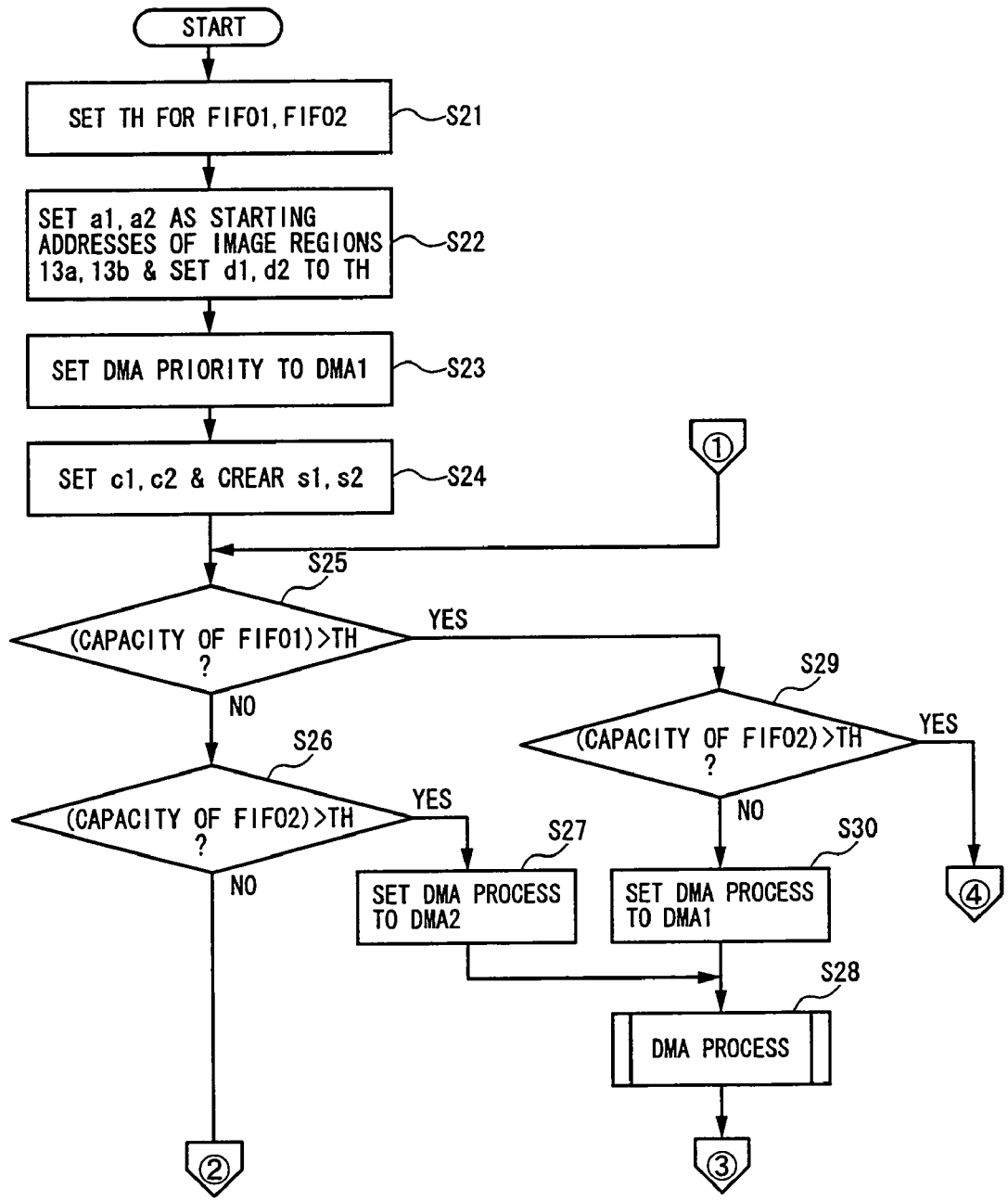
FIG. 7 is a flow chart for explaining the operation of the second embodiment of the image processing system.

In FIG. 7, a step S21 sets a threshold value TH for the FIFO buffers (FIFO1 and FIFO2) 21 and 22. A step S22 sets DMA transfer destination addresses a1 and a2 as starting addresses of the image regions 13a and 13b (image regions 1 and 2) of the RAM 13, and sets DMA transfer sizes d1 and d2 to the threshold value TH. A step S23 sets a DMA priority order of a DMA transfer DMA1 in which the image data within the FIFO buffer 21 is transferred by the DMA transfer to the image region 13a (image region 1) within the RAM 13, higher than a DMA priority order of a DMA transfer DMA2 in which the image data within the FIFO buffer 22 is transferred by the DMA transfer to the image region 13b (image region 2) within the RAM 13. In addition, a step S24 sets capture image sizes c1 and c2 with respect to the DMA transfers DMA1 and DMA2, and also clears image transfer sizes s1 and s2.

Figure 8:
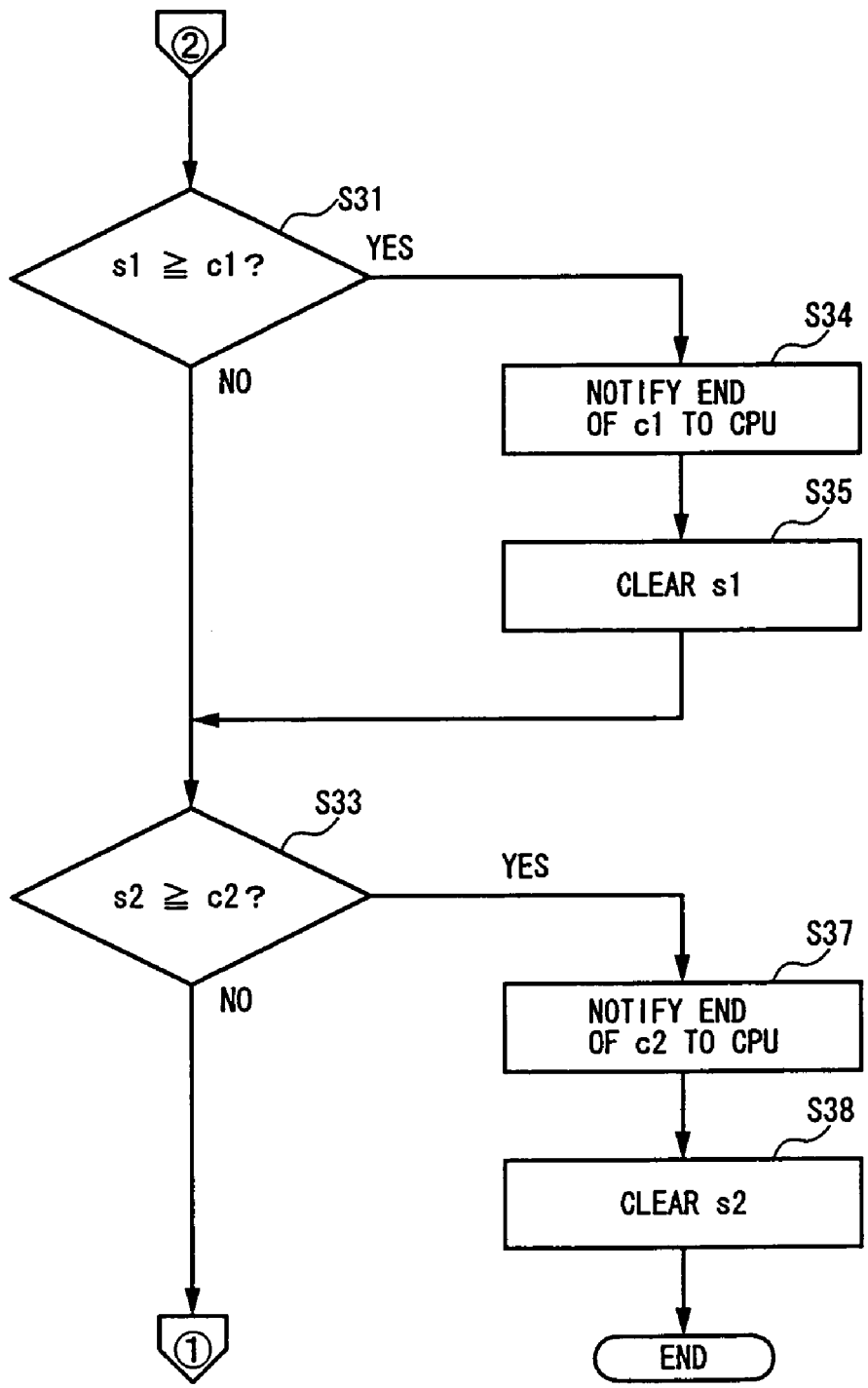
FIG. 8 is a flow chart for explaining the operation of the second embodiment of the image processing system.
Figure 9:
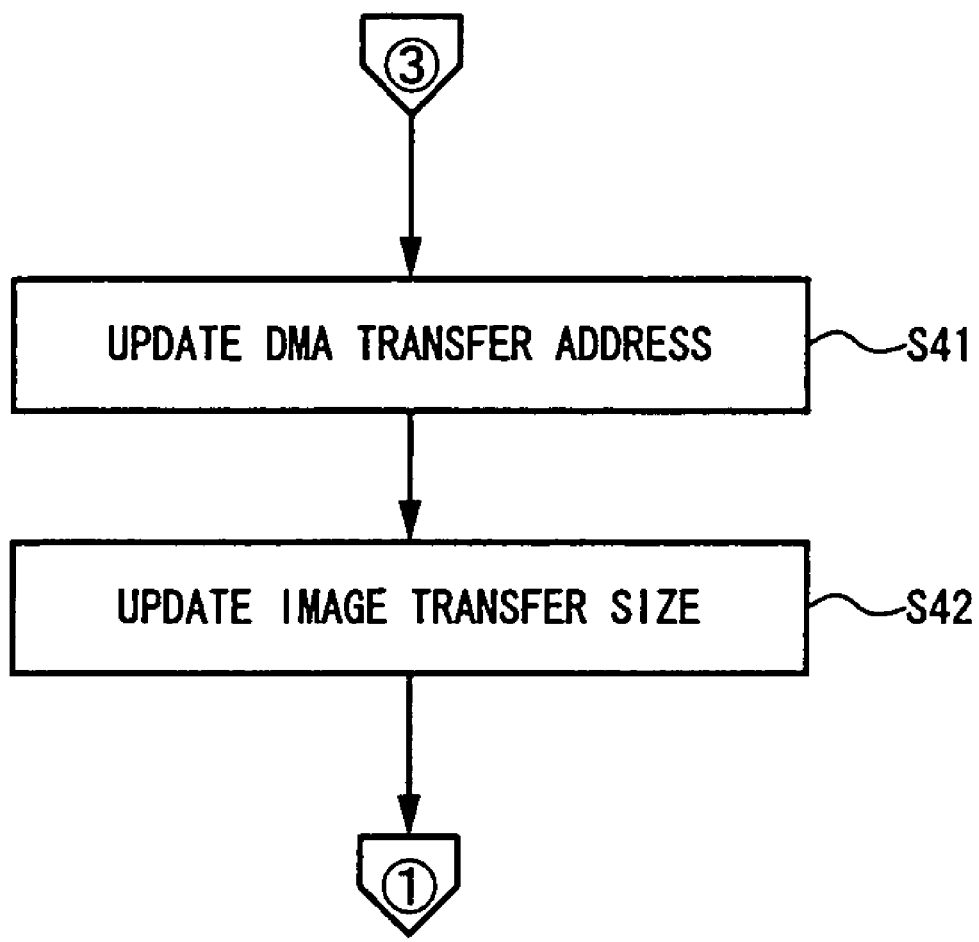
FIG. 9 is a flow chart for explaining the operation of the second embodiment of the image processing system.

A step S25 decides whether or not the usable storage capacity of the FIFO buffer 21 is greater than the threshold value TH. If the decision result in the step S25 is NO, a step S26 decides whether or not the usable storage capacity of the FIFO buffer 22 is greater than the threshold value TH. The process advances to a step S31 shown in FIG. 8 if the decision result in the step S26 is NO. In FIG. 8, the step S31 decides whether or not the image transfer size s1 of the DMA transfer DMA1 is greater than or equal to the capture image size c1. If the decision result in the step S31 is YES, a step S34 notifies an end of the capture image size c1 to the CPU 11-2 by an interrupt, for example, and a step S35 clears the image transfer size s1. If the decision result in the step S31 is NO or, after the step S35, a step S33 decides whether or not the image transfer size s2 of the DMA transfer DMA2 is greater than or equal to the capture image size c2. If the decision result in the step S33 is YES, a step S37 notifies an end of the capture image size c2 to the CPU 11-2 by an interrupt, for example, and a step S38 clears the image transfer size s2. The process ends after the step S38. In other words, the condition for ending the DMA transfer is that the image transfer size is greater than or equal to the capture image size. On the other hand, the process returns to the step S25 shown in FIG. 7 if the decision result in the step S33 is NO.

Returning now to the description of FIG. 7, if the decision result in the step S26 is YES, a step S27 sets the DMA process to the DMA transfer DMA2, and the step S28 carries out the DMA process. After the step S28, the process advances to a step S41 shown in FIG. 9. The step S41 updates the DMA transfer address, and a step S42 updates the image transfer size by adding the DMA transfer size. After the step S42, the process returns to the step S25 shown in FIG. 7.

Returning again to the description of FIG. 7, if the decision result in the step S25 is YES, a step S29 decides whether or not the usable storage capacity of the FIFO buffer 22 is greater than the threshold value TH. The process advances to a step S51 shown in FIG. 10 if the decision result in the step S29 is YES. On the other hand, if the decision result in the step S29 is NO, a step S30 sets the DMA process to the DMA transfer DMA1, and the step S28 carries out the DMA process. After the step S28, the process advances to the step S41 shown in FIG. 9.

Figure 10:
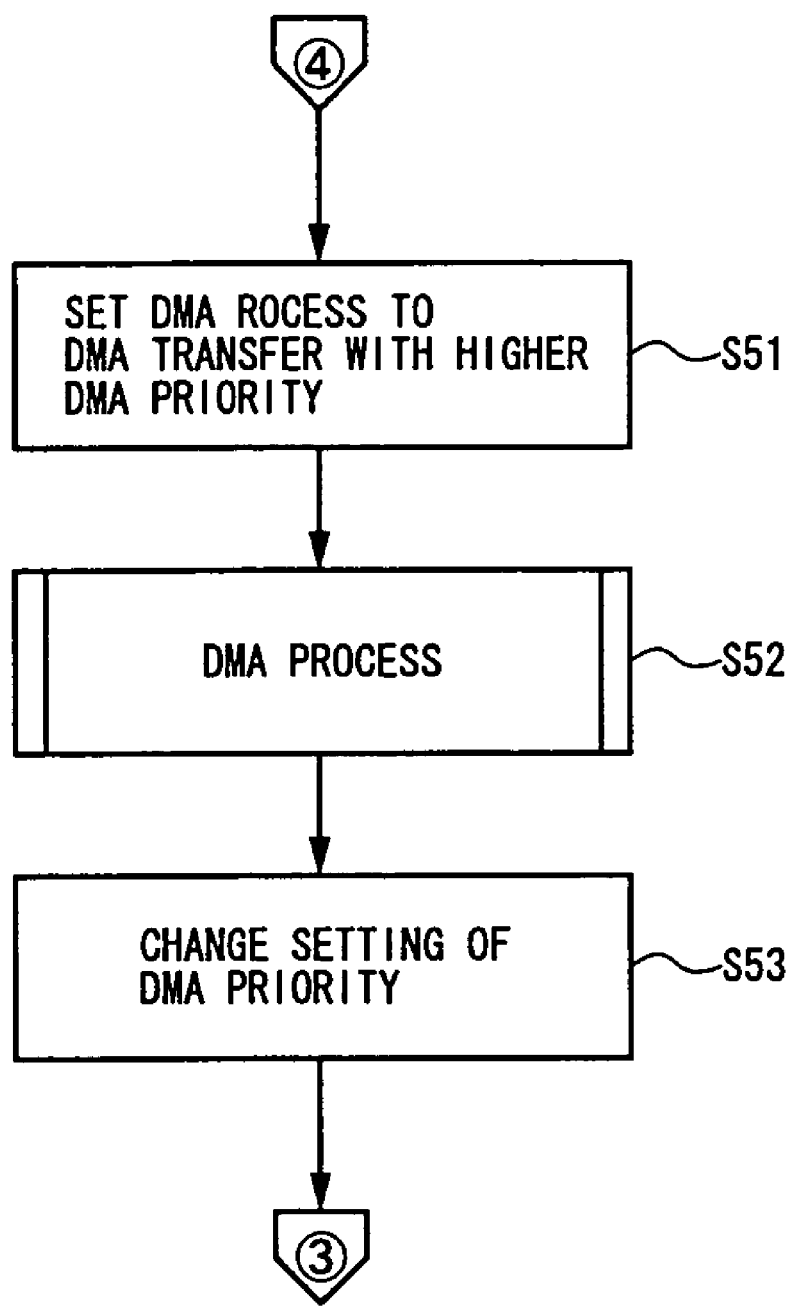
FIG. 10 is a flow chart for explaining the operation of the second embodiment of the image processing system.

In FIG. 10, the step S51 sets the DMA process to the DMA transfer DMA1 or DMA2 having the higher DMA priority order. A step S52 carries out the DMA process of the set DMA transfer DMA1 or DMA2. In addition, a step S53 changes the setting of the DMA priority order. In other words, if the DMA priority order of the DMA transfer DMA1 is set higher than that of the DMA transfer DMA2, the DMA priority order of the DMA transfer DMA2 is changed and set higher than the DMA transfer DMA1, and vice versa. After the step S53, the process advances to the step S41 shown in FIG. 9.

In each of the first and second embodiments described above, it is not essential for the electronic filing apparatus 35 to be connected externally to the MFP 10-1 and MFP 10-2. In other words, if the storage capacity of the HDD 20 is sufficiently large, the CPU 11-1 or 11-2 and the HDD 20 may function as the electronic filing apparatus 35 and the storage unit 36. In this case, the electronic filing becomes possible without the need to externally provide an independent electronic filing apparatus with respect to the MFP 10-1 or 10-2.

Therefore, according to the present invention, it is possible to realize an image processing method, an image processing apparatus and an image processing system which can electronically file image data which are processed in an environment where a plurality of kinds of functions can be carried out in parallel, without requiring a user to be aware of such an electronic filing.

In addition, according to the present invention, the image data which are input and output with respect to the image data bus line and processed in parallel, as in the case of the second embodiment, can temporarily be stored within the buffer and then transferred by the DMA transfer and stored in the image storing means, independently of the processing carried out in parallel. Hence, if a simple control is carried out to temporarily store the image data on the first and second image data bus lines in the first and second buffers, and the DMA transfer requests for the image data within the first and second buffers are generated simultaneously, the image data within one of the first and second buffers is transferred by the DMA transfer to the first image storing means according to the DMA priorities assigned to the DMA transfer requests, so that the image data within the other of the first and second buffers is transferred thereafter. As a result, the image data within the first and second buffers can be transferred to and stored in the first image storing means without any data dropout.

On the other hand, the image data stored in the first image storing means may be transferred to and stored in the second image storing means which may be of a type identical to or different from the first image storing means. In addition, by inputting and outputting the image data at a high speed within the image processing apparatus, it is possible to transfer the image data to the electronic filing apparatus which may be provided internally or externally to the image processing apparatus. The image data transferred to the electronic filing apparatus is stored in the storage unit in an easily retrievable and reusable manner, so that the image data can be utilized effectively.

The electronic filing of the image data which are subjected to the parallel processing in the image processing apparatus does not require a troublesome operation to be carried out by the user or a request to be made by the user, since the image data can be transferred automatically from the image processing apparatus to the electronic filing apparatus without the user being aware of such image data transfer.

Further, the present invention is not limited to these embodiments, but various variations and modifications may be made without departing from the scope of the present invention.

What is claimed is:

1. An image processing method comprising:
performing, in parallel, a process of one of an image reading function, an image recording function, an image copying function and an image communicating function, while performing at least another process of the image reading function, the image recording function, the image copying function and the image communicating function;
storing automatically a file of the image data processed by said performing independently of processes of the image reading function, the image recording function, the image copying function and the image communicating function;
buffering the image data temporarily in a buffer before said storing, said buffer including a first buffer and a second buffer;
causing a DMA transfer request when a storage capacity of at least one of said first and second buffers occupied by the image data reaches a predetermined preset value; and
transferring the image data within said buffer by a DMA transfer over a DMA transfer line based on the DMA transfer request, wherein said transferring depends on a preset priority order when two DMA transfer requests for the image data in the first and second buffers are received simultaneously.

2. The image processing method as claimed in claim 1, wherein said performing further stores the file of the image data in a storage unit which is provided internally or externally to an image processing apparatus which has each of the functions.

3. The image processing method as claimed in claim 2, wherein said performing further transfers the image data processed by each of the functions on one or a plurality of buses within the image processing apparatus.

4. The image processing method as claimed in claim 2, wherein said performing further carries out the processes of the two or more functions in response to an internal command and/or an external command of the image processing apparatus.

5. The image processing method as claimed in claim 4, wherein the external command is issued from one or a plurality of external apparatus coupled to the image processing apparatus via a network.

6. The image processing method as claimed in claim 1, wherein said storing further stores the file of the image data by adding specific information which enables identification of the file.

7. An image processing apparatus comprising:
a scanner configured to read a document and to output image data;
a facsimile communication unit configured to transmit and receive image data via a communication line;
a plotter configured to record an image on a recording medium based on image data; and
a control unit configured to control a process of one of said scanner, said facsimile communication unit and said plotter to process the image data in parallel while controlling at least another process of said scanner, said facsimile communication unit and said plotter,
said control unit is further configured to automatically store a file of the image data processed in parallel in a storage unit, independently of processes of said scanner, said facsimile communication unit and said plotter, said control unit including:
a buffer configured to temporarily buffer the image data on an image data bus line, said buffer including a first buffer and a second buffer;
a DMA transfer bus line configured to transfer the image data within said buffer by a DMA transfer; and
an image transfer unit configured to transfer the image data within said buffer to said DMA transfer bus line based on a DMA transfer request;
wherein a DMA transfer request is supplied to said image transfer unit when a storage capacity of at least one of said first and second buffers occupied by the image data reaches a predetermined preset value, and the transfer of the image data within said first and second buffers depends on a preset priority order when two DMA requests for the image data in the first and second buffers are received simultaneously.

8. The image processing apparatus as claimed in claim 7, wherein said storage unit is provided internally or externally to the image processing apparatus.

9. The image processing apparatus as claimed in claim 8, further comprising:
one or a plurality of buses transferring the image data processed by said scanner, said facsimile communication unit and said plotter within the image processing apparatus.

10. The image processing apparatus as claimed in claim 8, wherein said control unit controls two or more of said scanner, said facsimile communication unit and said plotter to process the image data in parallel in response to an internal command and/or an external command to the image processing apparatus.

11. The image processing apparatus as claimed in claim 10, wherein the external command is issued from one or a plurality of external terminals coupled to the image processing apparatus via a network.

12. The image processing apparatus as claimed in claim 7, wherein said control unit stores the file of the image data in the storage unit by adding specific information which enables identification of the file.

13. An image processing apparatus comprising:
means for reading a document and for outputting image data;
means for communicating image data via a communication line;
means for recording an image on a recording medium based on image data; and
means for controlling a process of one of said means for reading, said means for communicating and said means for recording to process the image data in parallel while controlling at least another process of said means for reading, said means for communicating and said means for recording,
said means for controlling further automatically stores a file of the image data processed in parallel in means for storing, independently of processes of said means for reading, said means for communicating and said means for recording, wherein said means for controlling includes:
means for buffering the image data temporarily in a buffer said buffer including a first buffer and a second buffer;
means for requesting a DMA transfer when a storage capacity of at least one of said first and second buffers occupied by the image data reaches a predetermined preset value; and
means for transferring the image data within said buffer by a DMA transfer based on the means for requesting a DMA transfer, and said transferring depends on a preset priority order when two DMA transfer requests for the image data in the first and second buffers are received simultaneously.

14. An image processing apparatus comprising:
an image data bus line configured to transfer image data;
an image reading part configured to read a document image and to output read image data to said image data bus line;
an image communicating part configured to receive image data from a communication line to output received image data to said image data bus line, and to receive transmitting image data from said image data bus line to transmit the transmitting image data to the communication line;
an image recording part configured to receive recording image data from said image data bus line and to record an image on a recording medium based on the recording image data;
a control unit configured to control one of said image reading part, said image communicating part and said image recording part which is unused for the processing of the image data to process the image data in parallel, while performing at least one of a reading operation by said image reading part, a recording operation by said image recording part, a transmitting operation by said image communicating part and a receiving operation by said image communicating part;
a buffer configured to temporarily buffer the read image data, the transmitting image data and the received image data on said image data bus line, said buffer including a first buffer and a second buffer;
a DMA transfer bus line configured to transfer the image data within said buffer by a DMA transfer; and
an image transfer unit configured to transfer the image data within said buffer to said DMA transfer bus line based on a DMA transfer request;
wherein a DMA transfer request is supplied to said image transfer unit when a storage capacity of at least one of said first and second buffers occupied by the image data reaches a predetermined preset value, and wherein an image transfer by said image transfer unit depends on a preset priority order when two DMA transfer requests for the image data in the first and second buffers are received simultaneously.

15. The image processing apparatus as claimed in claim 14, further comprising:
an image storing part configured to buffer the image data on said DMA transfer bus line.

16. The image processing apparatus as claimed in claim 15, wherein said image storing part includes first and second image storing parts configured to store the image data on said DMA transfer bus line, and the image data within said first image storing part is transferred to and stored in said second image storing part.

17. The image processing apparatus as claimed in claim 16, wherein said first image storing part is made up of a memory.

18. The image processing apparatus as claimed in claim 16, wherein said second image storing part is made up of a hard disk drive.

19. The image processing apparatus as claimed in claim 14, wherein:
said image data bus line includes a first image data bus line and a second image data bus line which are independently usable by operations carried out in parallel; and
wherein said a first buffer is configured to temporarily buffer image data on the first image data bus line, and said second buffer is configured to temporarily buffer image data on the second image data bus line.

20. The image processing apparatus as claimed in claim 19, wherein
the image transfer unit is configured to receive the DMA transfer request at a preset timing.

21. The image processing apparatus as claimed in claim 20, wherein the priority order is alternately switched every time the DMA transfer requests for the image data within the first and second buffers are received simultaneously.

22. An image processing system comprising:
an image processing apparatus including:
an image reading part configured to read a document and to output image data;
an image communicating part configured to communicate image data via a communication line;
an image recording part configured to record an image on a recording medium based on image data; and
a control unit configured to control a process of one of said image reading part, said image communicating part and said image recording part in parallel while controlling at least another process of said image reading part, said image communicating part and said image recording part;
an electronic filing apparatus coupled to said image processing apparatus;
a storage unit coupled to said electronic filing apparatus;
a buffer configured to temporarily buffer the image data, said buffer including a first buffer and a second buffer;
a DMA transfer bus line configured to transfer the image data within said buffer by a DMA transfer; and
an image transfer unit configured to transfer the image data within said buffer to said DMA transfer bus line based on a DMA transfer request;
wherein a DMA transfer request is supplied to said image transfer unit when a storage capacity of at least one of said first and second buffers occupied by the image data reaches a predetermined preset value, and wherein
said control unit is further configured to automatically store a file of the image data processed in parallel in said storage unit, independently of processes of said image reading part, said image communicating part and said image recording part, and
said transfer of the image data within the buffer to the DMA transfer bus line depends on a preset priority order when two DMA transfer requests for the image data in the first and second buffers are received simultaneously.

23. The image processing system as claimed in claim 22, wherein said image processing apparatus and said electronic filing apparatus are coupled via a network.

24. The image processing system as claimed in claim 23, wherein said image processing apparatus further includes a network connecting part configured to connect said image processing apparatus to said network.

25. An image processing system comprising:
an image processing apparatus including:
an image data bus line configured to transfer image data;
an image reading part configured to read a document image and to output read image data to said image data bus line;
an image communicating part configured to receive image data from a communication line to output received image data to said image data bus line, and to receive transmitting image data from said image data bus line to transmit the transmitting image data to the communication line;
an image recording part configured to record recording image data from said image data bus line and to record an image on a recording medium based on the recording image data;
a control unit configured to control one of said image reading part, said image communicating part and said image recording part which is unused for the processing of the image data to process the image data in parallel, while performing at least one of a reading operation by said image reading part, a recording operation by said image recording part, a transmitting operation by said image communicating part and a receiving operation by said image communicating part;
an electronic filing apparatus coupled to said image processing apparatus;
a storage unit coupled to said electronic filing apparatus;
a buffer configured to temporarily buffer the read image data, the transmitting image data and the received image data on said image data bus line, said buffer including a first buffer and a second buffer;
a DMA transfer bus line configured to transfer the image data within said buffer by a DMA transfer; and
an image transfer unit configured to transfer the image data within said buffer to said DMA transfer bus line based on a DMA transfer request;
wherein a DMA transfer request is supplied to said image transfer unit when a storage capacity of at least one of said first and second buffers occupied by the image data reaches a predetermined preset value; and wherein
said electronic filing apparatus is further configured to store automatically a file of the image data processed in parallel within said image processing apparatus into said storage unit, independently of the reading, recording, transmitting and receiving operations in said image processing apparatus, and
said transfer of the image data within the buffer to the DMA transfer bus line depends on a preset priority order when two DMA transfer requests for the image data in the first and second buffers are received simultaneously.

26. The image processing system as claimed in claim 25, wherein said image processing apparatus and said electronic filing apparatus are coupled via a network.

27. The image processing system as claimed in claim 26, wherein said image processing apparatus further includes a network connecting part configured to connect said image processing apparatus to said network.

* * * * *